United States Patent [19]

Coué

[11] Patent Number: 4,486,182
[45] Date of Patent: Dec. 4, 1984

[54] DERAILLEUR MECHANISM FOR A BICYCLE

[75] Inventor: Maurice E. L. Coué, Feucherolles, France

[73] Assignee: Huret et ses Fils, Nanterre, France

[21] Appl. No.: 388,208

[22] Filed: Jun. 14, 1982

[30] Foreign Application Priority Data

Jun. 17, 1981 [FR] France .................. 81 11972

[51] Int. Cl.³ .............................. F16H 11/08
[52] U.S. Cl. ........................ 474/80; 474/78
[58] Field of Search ............. 474/78, 80, 81, 82; 248/421, 286; 74/99, 101, 102, 103, 105; 33/454, 441, 434

[56] References Cited

U.S. PATENT DOCUMENTS

| 967,877 | 8/1910 | Bauer | 248/281.1 |
| 2,104,301 | 1/1938 | Haughey | 33/454 |
| 3,453,899 | 7/1969 | Tarutani et al. | 474/82 |
| 3,730,012 | 5/1973 | Juy | 474/82 |
| 4,164,249 | 8/1979 | Strub | 33/454 X |
| 4,237,743 | 12/1980 | Nagano | 474/82 |
| 4,286,953 | 9/1981 | Shimano | 474/80 |

FOREIGN PATENT DOCUMENTS

| 2153647 | 5/1973 | France | 474/80 |
| 2036895 | 7/1980 | United Kingdom | 474/82 |

Primary Examiner—Leslie A. Braun
Assistant Examiner—Dwight G. Diehl
Attorney, Agent, or Firm—Trexler, Bushnell & Wolters, Ltd.

[57] ABSTRACT

The invention provides a mechanism which is simpler in construction, cheaper and easier to assemble. The derailleur mechanism is of the type comprising a movable device for guiding or shifting the chain connected to a support in such manner as to be displaced in translation with respect to the support by means of an actuating device. The movable device is connected to the support, on one hand, by a link and, on the other hand, by a pin-and-slot connection. The slot has the shape of an arc of a circle whose radius is equal to the distance between the two pivot pins of the link.

10 Claims, 3 Drawing Figures

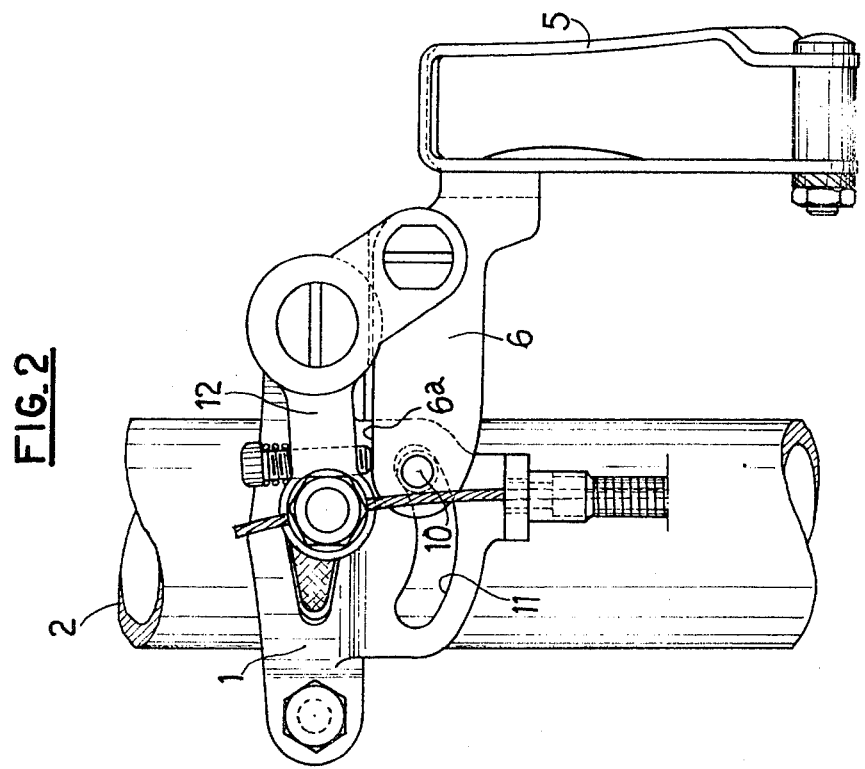
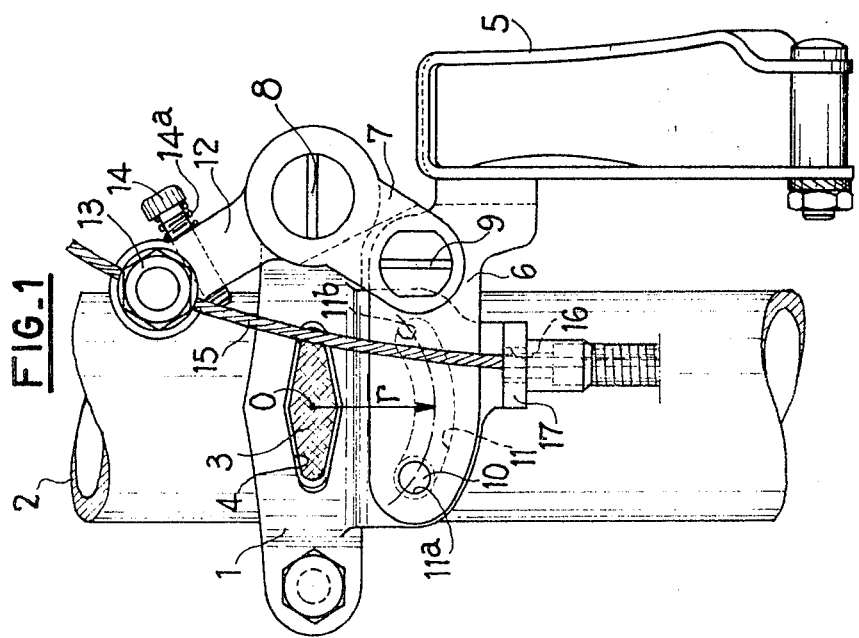

DERAILLEUR MECHANISM FOR A BICYCLE

The present invention relates to derailleur mechanisms employed for changing the gear ratio on a bicycle, whether it concerns rear derailleurs or crank-gear derailleurs.

It is known that derailleur mechanisms usually comprise a movable means for guiding or shifting the chain, said movable means being connected to support means by two parallel links, this assembly constituting therefore an articulated parallelogram structure. The shifting of the chain from one chain wheel to the other, or from one free wheel sprocket to the other, is achieved by actuating means which usually comprise a cable having one end secured to the movable means, for example on one of the two links, and an opposite end connected to a control lever.

Such a mechanism therefore comprises two links and four articulation axes so that it is relatively expensive to produce and assemble.

An object of the invention is to provide a mechanism which is simpler in construction, cheaper and easier to assemble.

The invention therefore provides a derailleur mechanism for a bicycle, of the type comprising a movable means for guiding or shifting the chain and connected to support means in such manner as to be movable in translation with respect to said support means by actuating means, wherein the movable means is connected to the support means, on one hand, by means of a link and, on the other hand, by means of a pin-and-slot connection, said slot having the shape of an arc of a circle whose radius is equal to the distance between the two articulation axes of the link.

According to other features of the invention:

the movable means is rigid with a lateral arm on which the link is articulated and which carries the pin or defines the slot;

at least one of the two ends of the slot acts as an end-of-travel abutment for determining at least one of the end positions of the movable means;

in the case where a single one of the ends of the slot acts as an end-of-travel abutment, there is provided an adjustable abutment which determines the other end position of the movable means, and this adjustable abutment cooperates with the upper edge of said lateral arm.

The invention will be described in more detail hereinafter with reference to the accompanying drawing which is given merely by way of example and in which:

FIGS. 1 and 2 are elevational views of a derailleur mechanism according to the invention in two different positions thereof;

Figure 3:
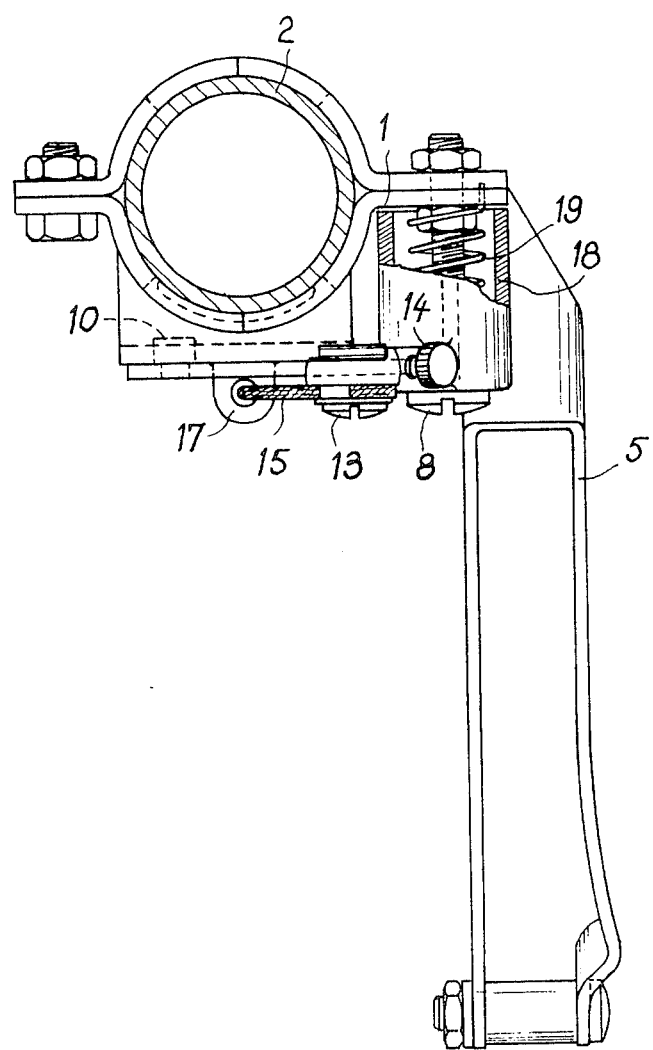
FIG. 3 is a top plan view, with a part cut away, of the mechanism in the position thereof shown in FIG. 1.

In the chosen embodiment, the invention is assumed to be applied to a derailleur mechanism of a crank-gear, the chain wheels of this crank-gear and the chain not being shown.

The mechanism comprises a support means 1, here formed by a collar which may be fixed to a bicycle frame. This support means and the tube 2 on which it is fixed may include complementary centering means such as for example, a lug 3 provided on the tube and a cavity 4 provided in the support means.

The movable means 5 for guiding and shifting the chain here comprises a fork member or yoke of conventional construction, which therefore does not need to be described in detail. This fork member is carried by a lateral arm 6. The latter is connected to the support means by a link 7 which is articulated to be pivotable about two pivot pins 8 and 9. Further, this lateral arm carries, in the vicinity of the end thereof, a pin or finger member 10 which is guided in a curved slot 11 provided on the support means, the pin 10 and slot 11 thus constituting a pin-and-slot connection 1. This slot has the shape of an arc of a circle whose means line has a radius r equal to the distance between the two pivot pins of the link 7.

In the chosen embodiment, the center O of the arc of a circle which constitutes the mean line of said slot is so disposed that the segment joining said center to the pivot pin 8 connecting the link to the support means is substantially equal and parallel to the segment joining the center of the pin 10 to the pivot pin 9 connecting the link to the lateral arm 6.

In the illustrated embodiment, the length of the slot is chosen to be slightly greater than the effective travel of the pin 10, as can be seen in FIG. 2.

In another embodiment, this length may be chosen in such manner as to correspond exactly to the length of the effective travel of the pin.

In a preferred embodiment, the link is a part of a more complex assembly which constitutes both an actuating lever and a cavity for a return spring. Thus, the link is extended by an arm 12 on which are provided, on one hand, a cable clamp 13 of conventional construction and, on the other hand, an adjustable abutment 14 provided with braking means 14a, this abutment being adapted to cooperate with the upper edge 6a of the lateral arm 6.

An actuating cable 15, secured in the cable clamp 13 at the end of the arm 12, passes through an orifice 16 provided in a tab 17 of the support means which acts as an abutment for the sheath of the cable.

The member which constitutes the link 7 and the arm 12 also defines a cavity 18 in which is disposed a return spring 19 which acts under torsion and tends to bias the movable means or fork member 5, and consequently the mechanism, toward the position shown in FIG. 1. This spring is coaxial to the pin 8.

This mechanism operates in a completely similar manner to that of a conventional derailleur and consequently does not be described in detail. It will be merely mentioned that, in starting at the position shown in FIG. 1 corresponding to the position of the chain on the small chain wheel, under the effect of a pull exerted on the cable 15, the mechanism is deformed and reaches the position shown in FIG. 2, in which the chain is shifted onto the large chain wheel. The two end positions are here determined, on one hand, by the abutment of the pin 10 against one of the ends 11a of the slot 11 and, on the other hand, by the contact of the adjustable abutment 14 with the upper edge 6a of the arm 6.

As just mentioned, in another embodiment, and assuming that the assembly of the derailleur is sufficiently precise, the adjustable abutment may be eliminated and the two end positions of the movable means are determined by the contact of the pin 10 with the two ends 11a, 11b of the slot 11.

The mechanism just described is particularly simple and has a very small number of component parts. This results from the use of a pin-and-slot connection which replaces a link and the two pivot pins thereof. An important simplification also results from the elimination of one, or even two, adjustable abutments which determine the ends-of-travel of the mechanism.

In a modification, the pin 10 is carried by the support means 1 and the slot 11 is defined by the lateral arm 6. In this case, the slot has the same radius r but its concavity faces downwardly as viewed in FIGS. 1 and 2, so as to achieve a guiding action which is equivalent to that illustrated.

The invention has been described in respect of a derailleur for a crank-gear. It will be understood that the same mechanism may be employed with the same advantages with a rear derailleur.

Having now described my invention what I claim as new and desire to secure by Letters Patent is:

1. A derailleur mechanism for a bicycle, the derailleur comprising support means, a fork member for guiding and shifting a chain, a lateral arm on said fork member, a link connecting the lateral arm to the support means, said link having a first pivot pin having a pivot center and located adjacent a first end of the link for pivotally connecting the link to the support means and a second pivot pin having a pivot center and located adjacent a second end of the link for pivotally mounting the link on the lateral arm, means defining a pin-and-slot connection between the lateral arm and the support means, said slot having a mean line in the shape of an arc of a circle whose radius is equal to the distance between said pivot center of said first pivot pin and said pivot center of said second pivot pin, said mean line having a center of curvature which is so located that a segment joining said center of curvature to said center of said first pivot pin is substantially equal to and substantially parallel to a segment joining said center of said pin of said pin-and-slot connection to said center of said second pivot pin, and actuating means connected to said link.

2. A mechanism according to claim 1, for shifting said link about said first pivot pin, wherein said fork member is rigid with the lateral arm.

3. A mechanism according to claim 1, further comprising a return spring interposed between and engaging said support means and said link for biasing said link against the action of said actuating means.

4. A mechanism according to claim 1, wherein at least one end of the slot acts as an end-of-travel abutment for the pin of said pin-and-slot connection determining at least one of two end positions of the fork member relative to the support means.

5. A mechanism according to claim 4, wherein only one end of the slot acts as an end-of-travel abutment, and there is provided an adjustable abutment means which determines the other end position of the fork member.

6. A mechanism according to claim 5, wherein said adjustable abutment means cooperates with an upper edge of the lateral arm.

7. A mechanism according to any one of the claims 1, 4, 5 and 6, wherein the link is extended by an arm so as to constitute an actuating lever on which the actuating means is secured.

8. A mechanism according to claim 7, wherein a member constituting the link and the arm also defines a cavity for a return spring, said return spring being connected at one end to said support and at an opposite end to said member constituting the link and the arm.

9. A derailleur mechanism for a bicycle, the derailleur comprising support means, a fork member for guiding and shifting a chain, a lateral arm on said fork member, a link connecting the lateral arm to the support means, said link having a first pivot pin having a pivot center and located adjacent a first end of the link for pivotally connecting the link to the support means and a second pivot pin having a pivot center and located adjacent a second end of the link for pivotally mounting the link on the lateral arm, means defining a pin-and-slot connection between the lateral arm and the support means, said slot having a mean line in the shape of an arc of a circle whose radius is equal to the distance between said pivot center of said first pivot pin and said pivot center of said second pivot pin, said mean line having a center of curvature which is so located that a segment joining said center of curvature to said center of said first pivot pin is substantially equal to and substantially parallel to a segment joining said center of said pin of said pin-and-slot connection to said center of said second pivot pin, and actuating means connected to said link, said slot of said pin-and-slot connection having an end which acts as an end-of-travel abutment for the pin of said pin-and-slot connection which determines an end-of-travel position of said fork member relative to said support means.

10. A mechanism according to claim 9, comprising an arm which is rigid with and extends from said link and constitutes an actuating lever to which said actuating means is secured.

* * * * *